United States Patent
Fatemi et al.

(10) Patent No.: US 12,088,146 B2
(45) Date of Patent: Sep. 10, 2024

(54) ROTOR FOR AN ELECTRIC MACHINE, ELECTRIC MACHINE FOR A VEHICLE, AND VEHICLE

(71) Applicant: GM GLOBAL TECHNOLOGY OPERATIONS LLC, Detroit, MI (US)

(72) Inventors: Alireza Fatemi, Canton, MI (US); Anthony M Coppola, Rochester Hills, MI (US); Derek F Lahr, Howell, MI (US); Alan G Holmes, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 468 days.

(21) Appl. No.: 17/445,739

(22) Filed: Aug. 24, 2021

(65) Prior Publication Data

US 2023/0070394 A1    Mar. 9, 2023

(51) Int. Cl.
  *H02K 1/27*      (2022.01)
  *H02K 1/278*    (2022.01)
  *H02K 1/28*      (2006.01)
  *H02K 5/128*    (2006.01)
  *H02K 15/03*    (2006.01)

(52) U.S. Cl.
  CPC .............. *H02K 1/278* (2013.01); *H02K 5/128* (2013.01); *H02K 15/03* (2013.01)

(58) Field of Classification Search
  CPC ........ H02K 1/278; H02K 5/128; H02K 15/03; H02K 1/28; H02K 1/2766
  See application file for complete search history.

(56) References Cited

U.S. PATENT DOCUMENTS

| | | | |
|---|---|---|---|
| 2011/0156521 A1* | 6/2011 | Nagashima | H02K 1/2766 310/156.28 |
| 2014/0327329 A1* | 11/2014 | Kitada | H02K 1/2766 310/43 |
| 2015/0123506 A1* | 5/2015 | Salas Nobrega | H02K 1/274 310/90 |
| 2019/0074739 A1* | 3/2019 | Brookes | H02K 1/278 |
| 2019/0181709 A1* | 6/2019 | Berendes | H02K 1/30 |
| 2022/0045563 A1* | 2/2022 | Park | H02K 1/2766 |
| 2022/0052570 A1* | 2/2022 | Takeda | H01F 3/02 |
| 2023/0179045 A1* | 6/2023 | Olsen | H02K 1/28 310/156.28 |

* cited by examiner

*Primary Examiner* — Thomas Truong
(74) *Attorney, Agent, or Firm* — Lorenz & Kopf LLP

(57) ABSTRACT

Rotor for electric machines and methods for fabricating rotors for electric machines are provided. An exemplary method includes assembling a stack of laminations to form a rotor core having an external surface. The rotor core defines one to five layers of internal cavities and an interior permanent magnet is positioned in a selected internal cavity. The method also includes locating a non-magnetic structural element in the selected internal cavity. Further, the method includes applying a compressive force on the external surface of the rotor core with an annular sleeve.

20 Claims, 5 Drawing Sheets

ROTOR FOR AN ELECTRIC MACHINE, ELECTRIC MACHINE FOR A VEHICLE, AND VEHICLE

INTRODUCTION

The technical field generally relates to rotors for electric machines, and more particularly relates to a rotor having an internal cavity housing an interior permanent magnet and having a compressive sleeve.

A rotor, such as for an interior permanent magnet (IPM) machine, includes a rotor core assembled around a rotation shaft. Typically, the rotor is constructed from segments that are assembled to form laminations, which are then stacked to form the rotor core body. The rotor core body typically includes cavities as flux barriers to influence operational characteristics of the machine. The laminations of the rotor core body are formed in a disc shape with a center opening for assembly on a rotation shaft. The flux barriers are distributed around the shaft opening. The flux barriers typically extend toward the shaft opening from ends adjacent to the circumference of the lamination. As described herein, the flux barrier cavities surround or contain permanent magnets.

The physical dimensions, number, and positioning of the flux barrier cavities influence the performance of the electric machine. Accordingly, even a large flux barrier placed in a non-optimum position may not result in optimal performance. In addition, electric machines are susceptible to flux leakage through lamination features around the flux barriers that may be structurally required. These factors lead to flux barrier design and positioning that results in only thin structural features being left to support parts of the rotor core. These thin lamination features may limit the performance and speeds achievable by the electric machine without overly stressing the rotor core, or without overly increasing feature size. Due to the presence of the flux barrier cavities, the rotor may be structurally weakened and thus may be unsuitable for high speed applications.

Accordingly, it is desirable to provide economical rotors for electric machines that achieve high performance with minimal structural feature size. In addition, it is desirable to provide rotors for electric machines that include annular sleeves providing a compressive force and non-magnetic structural elements to prevent cavity collapse or rotor deformation. Furthermore, other desirable features and characteristics of embodiments will become apparent from the subsequent detailed description and the appended claims, taken in conjunction with the accompanying drawings and the foregoing technical field and background.

SUMMARY

Rotors for electric machines, electric machines for vehicles, vehicles, and methods for manufacturing the same are provided. In an exemplary embodiment, a method is provided for fabricating a rotor for an electric machine. The exemplary method includes assembling a stack of laminations to form a rotor core having an external surface. The rotor core defines one to five layers of internal cavities and an interior permanent magnet is positioned in at least one selected internal cavity. The method also includes locating a non-magnetic structural element in the selected internal cavity. Further, the method includes applying a compressive force on the external surface of the rotor core with an annular sleeve.

In certain embodiments, applying the compressive force on the external surface of the rotor core with the annular sleeve comprises providing a pre-formed annular sleeve and press-fitting the pre-formed annular sleeve on the external surface of the rotor core.

In certain embodiments, applying the compressive force on the external surface of the rotor core with the annular sleeve comprises tension winding a fiber around the external surface of the rotor core and curing the fiber to form the annular sleeve on the external surface of the rotor core.

In certain embodiments, the annular sleeve is a mesh formed with a plurality of radial openings.

In certain embodiments, the external surface of the rotor core is contoured to define depressions and the annular sleeve is received within the depressions.

In certain embodiments, the annular sleeve has a maximum thickness of less than 5 millimeters (mm), such as less than 2 mm.

In certain embodiments, locating the non-magnetic structural element in the selected internal cavity comprises injecting a polymer resin into the selected internal cavity and curing the polymer resin. In additional embodiments, the polymer resin is bonded to a wall of the selected internal cavity of the rotor and to the interior permanent magnet.

In certain embodiments, the selected internal cavity is a V-shaped cavity and includes a first leg portion and a second leg portion, the interior permanent magnet includes a first interior permanent magnet positioned in the first leg portion of the selected internal cavity, the interior permanent magnet includes a second interior permanent magnet positioned in the second leg portion of the selected internal cavity, and the non-magnetic structural element extends from contact with the first interior permanent magnet to contact with the second interior permanent magnet.

In certain embodiments, assembling the stack of laminations to form the rotor core comprises assembling lamination segments to form each lamination with a cavity, inserting a magnet layer in the cavity, and stacking the laminations.

In another exemplary embodiment, a rotor for an electric machine is provided. In one embodiment, the rotor includes a rotor core having an external surface. The rotor core defines one to five layers of internal cavities. The rotor also includes an interior permanent magnet located in a selected internal cavity. The rotor also includes a non-magnetic structural element located in the selected internal cavity. Further, the rotor includes an annular sleeve surrounding and applying a compressive force on the external surface of the rotor core.

In certain embodiments, the annular sleeve is a mesh formed with a plurality of radial openings.

In certain embodiments, the external surface of the rotor core is contoured to define depressions, wherein the annular sleeve is received within the depressions.

In certain embodiments, the annular sleeve has a maximum thickness of less than 5 millimeters (mm), such as less than 2 mm.

In certain embodiments, the rotor core has a maximum outer diameter of from 100 to 200 millimeters (mm) and a maximum axial length of from 50 to 200 millimeters (mm).

In certain embodiments, the structural element is an injected polymer resin. In additional embodiments, the structural element is an injected polymer resin bonded to a wall of the selected internal cavity of the rotor and to the interior permanent magnet.

In certain embodiments, the selected internal cavity is a V-shaped cavity and includes a first leg portion and a second leg portion, the interior permanent magnet includes a first interior permanent magnet located in the first leg portion of the selected internal cavity, the interior permanent magnet includes a second interior permanent magnet located in the second leg portion of the selected internal cavity, and the non-magnetic structural element extends from contact with the first interior permanent magnet to contact with the second interior permanent magnet.

In certain embodiments, the selected internal cavity of the rotor core is separated from the external surface or the rotor core by a bridge portion of the rotor core.

In another exemplary embodiment, a vehicle is provided. The exemplary vehicle includes an electric machine configured to actuate the vehicle. In an exemplary embodiment, the electric machine includes a rotor and a stator. An exemplary rotor includes a rotor core having an external surface, wherein the rotor core defines an internal cavity. Further, the exemplary rotor includes an interior permanent magnet located in the internal cavity and a non-magnetic structural element located in the internal cavity. Also, the exemplary rotor includes an annular sleeve surrounding and applying a compressive force on the external surface of the rotor core.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
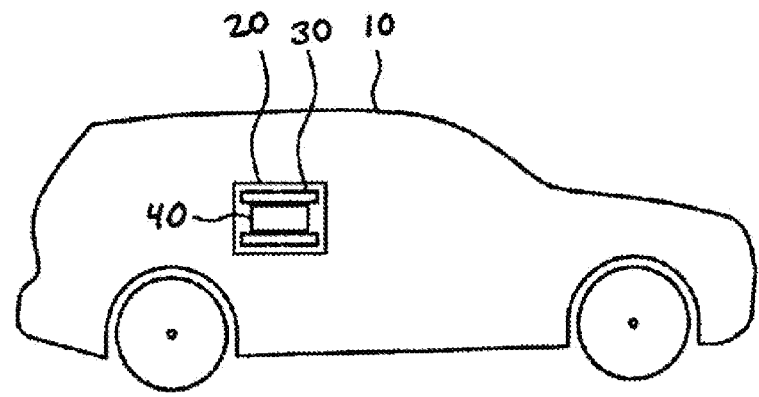
FIG. 1 a diagram of an exemplary embodiment of a vehicle with an exemplary embodiment of an electric machine, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

As used herein, the "%" or "percent" described in the present disclosure refers to the weight percentage unless otherwise indicated. Further, as used herein, an element identified as a "material" includes at least 50 wt. % of the recited material. As used herein, an element identified as "primarily material" is a material that includes at least 90 wt. % of the recited material.

Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" and "minor" or "major" are illustrative only and are not intended to limit the scope of the subject matter in any way. It is noted that while embodiments may be described herein with respect to automotive applications, those skilled in the art will recognize their broader applicability.

Embodiments herein are related to rotors in electric machines for vehicles, and to maintaining or improving the structural or mechanical strength of such rotors while maintaining or improving the magnetic performance of such rotors, i.e., minimizing magnetic leaks. In the embodiments described herein, the rotors include interior permanent magnets. Such magnets are located within the rotor core and are radially distanced from the external surface of the outer diameter of the rotor core.

Embodiments herein include features that enable the use of an annular sleeve as a tension structural element for the transfer of loads to itself and away from thin, relatively weak parts of the rotor core. As used herein, the term structural element refers to a load carrying object without limitation. In addition, the term compressive does not require deformation of the structural element but means that a compressive load may be applied to the structural element and in response, the compressive structural element applies a preload to the core, wherein the preload may be zero or greater when the rotor is stationary. For example, a compressive annular sleeve may be made of any material that is sufficiently rigid to carry the applied loads. The compressive annular sleeve may be included without negative impact to the rotor's magnetics. Higher rotor speed and desirable magnetic performance may be achieved while maintaining desirably thin and light lamination features such as webs, struts and bridges, resulting in relatively low material cost, weight and compact size.

As described herein, exemplary embodiments provide for pre-stressing or pre-loading the rotor core before operation by applying a compressive force on the external surface of the rotor core with an annular sleeve. Further, such embodiments provide the rotor core with sufficient mechanical or structural strength to withstand the compression forces of the annular sleeve by at least partially filling rotor cavities with a non-magnetic structural element or elements. Therefore, the rotor core does not buckle, collapse, or otherwise deform upon application of the compressive stress by the annular sleeve.

During operation of the electric machine, the rotor must withstand centrifugal forces or loads. The compressive annular sleeve and the non-magnetic structural element work in tandem to carry the mechanical load imposed during operation of the electric machine. For example, the non-magnetic structural element may transmit forces from the axial region of the rotor to the annular sleeve. As a result, magnetic structural elements, such as inter-cavity webs formed from electrical steel, may be reduced in size or thickness or may be eliminated from the rotor core.

Exemplary embodiments reduce magnetic leakage while maintaining structural integrity such that the electric machine maintains reliable operation. Further, exemplary embodiments provide for safe and reliable operation of the electric machine at higher rotation speeds.

Further, exemplary embodiments may provide for mass reduction, lower piece cost, increased torque, reduced magnet content, high-speed operation, reduced active material mass, and improved packaging.

FIG. 1 is a basic diagram of an exemplary embodiment of a vehicle 10 that includes an exemplary embodiment of an electric machine 20. The electric machine 20 is formed by a stator 30 and a rotor 40 arranged within the stator 30. Electric machine 20 is designed to actuate or drive the vehicle 10. The vehicle 10 may be an electric vehicle or a hybrid vehicle, accordingly.

Figure 2:
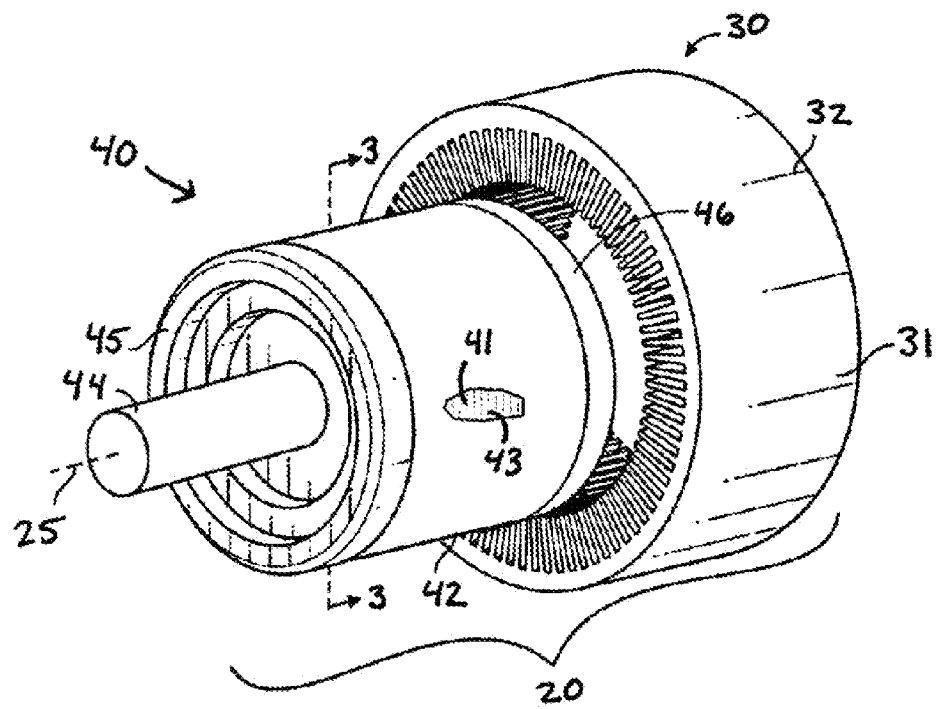
FIG. 2 is a schematic illustration of the electric machine of FIG. 1, in accordance with various embodiments.

FIG. 2 illustrates the structure of the electric machine 20 in more detail. As shown, the electric machine 20 includes stator 30 and rotor 40, and rotor 40 is configured to rotate about an axis 25 defined by the electric machine 20. In the illustration, the rotor 40 is shown outside the stator 30 for visibility.

In the illustrated embodiment, the electric machine 20 is configured as a motor in which the current in the rotor 40 that produces torque is induced from the magnetic field created by energization of the stator 30. In a number of embodiments, the electric machine 20 is an alternating current machine suitable for use in applications requiring regulated speed control such as for a vehicle traction motor, although this disclosure is not limited to such applications.

The exemplary stator 30 is a generally annular shaped component, which may be constructed for single-phase power or multiple phase power such as, three-phase. In an exemplary embodiment, the stator 30 includes a stator core 31 made of a stack of stator laminations 32. The stator laminations 32 may be formed by stampings that are slotted to receive windings (not shown), and are made of a soft magnetic material such as silicon steel. The stator laminations 32 may be insulated from one another by a thin non-conductive coating. In other embodiments, another ferromagnetic material may be used. The stator 30 may include the windings for energization.

As shown in FIG. 2, the exemplary rotor 40 includes a rotor core 41 surrounded by an annular sleeve 42. In the illustration, a portion of the annular sleeve 42 is broken away to allow the underlying rotor core 41 to be viewed. The exemplary rotor core 41 is formed by a stack of rotor laminations 43 and is configured to receive a shaft 44. An exemplary rotor core 41 has a maximum outer diameter of from 100 to 200 millimeters (mm) and a maximum axial length of from 50 to 200 millimeters (mm). Exemplary rotor laminations 43 may be stamped or otherwise formed. Exemplary rotor laminations 43 are made of a ferromagnetic material and may be insulated from one another by a thin non-conductive coating, or may be made of another material. Exemplary rotor laminations 43 are formed from electrical steel. End rings 45, 46 are formed at the ends of the rotor core 41. In exemplary embodiments, the end rings 45, 46 are fabricated of an aluminum material for light weight. The rotor 40 is configured with a number of poles to create the magnetic circuit of the rotor 40, which depends on the angular position of the rotor 40, for interacting with that induced by the stator 30 of the electric machine 20. These poles may be created, at least in-part, by flux barriers as described below.

Figure 3:
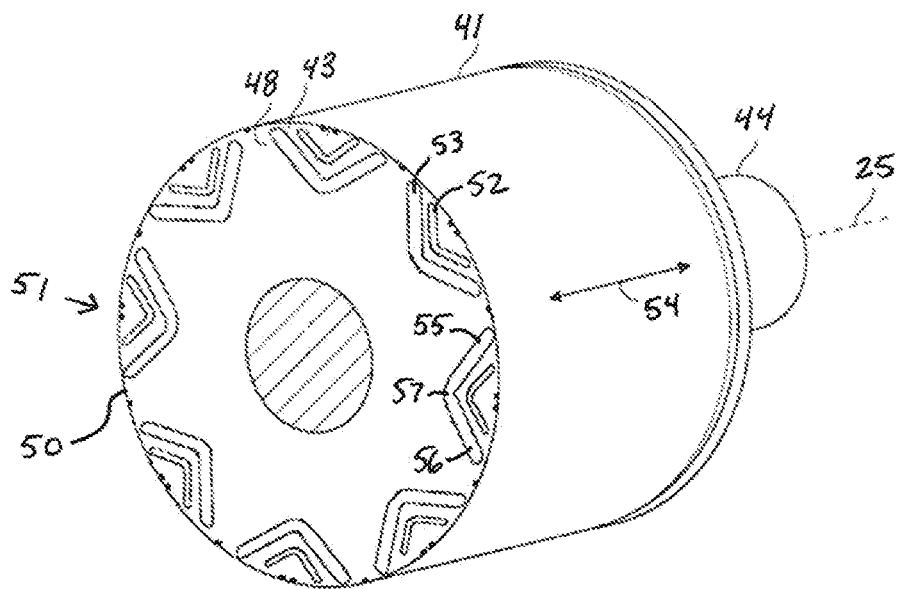
FIG. 3 is a fragmentary, cross sectional illustration of the rotor core of FIG. 2, taken generally along the line 3-3, in accordance with various embodiments.

FIG. 3 illustrates the rotor core 41 of FIG. 2 in isolation and in more detail. In FIG. 3, the rotor core 41 is shown in cross section with a side 48 of one of the laminations 43 exposed and visible.

As shown, the lamination 43 includes a number of openings, referred to as cavities, that may serve multiple purposes. Distributed around the rotor core 41 near the external surface of outer perimeter 50 are eight cavity groups 51, each formed with two angled layers including a minor internal cavity 52 and a major internal cavity 53. The internal cavities 52 and 53 in each cavity group 51 extend through the stacked rotor laminations 43 in a longitudinal direction 54, which is parallel to the axis 25 of the shaft 44. The cavity groups 51 operate as barriers to magnetic flux and help define the magnetic poles of the rotor. Accordingly, in the illustrated embodiment, the rotor has eight poles. The rotor may be formed with any suitable desired number of poles. For example, the rotor may be formed with six poles.

As shown in FIG. 3, each internal cavity 52 and 53 is generally V-shaped, such that each V-shape cavity includes a first leg portion 55 and second leg portion 56 that merge together at an open joint 57. In exemplary embodiments herein and as shown, the first leg portion 55 and second leg portion 56 are not separated from one another by any web or other structural component. Rather, each single cavity 52 or 53 is formed by and includes a leg portion 55 and a leg portion 56.

Figure 4:
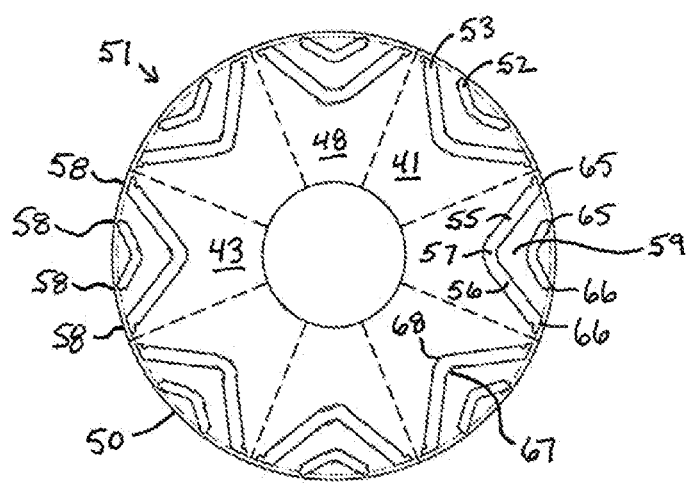
FIG. 4 is a plan view of a lamination of the rotor core of FIG. 3, in accordance with various embodiments.

FIG. 4 is a plan view showing the side 48 of rotor core 41 of FIG. 3. In FIG. 4, dashed lines illustrate each cavity group 51. As shown in FIG. 4, each cavity 52 or 53 extends from and terminates at a first end 65 and a second end 66. More specifically, each first leg portion 55 extends from the first end 65 to the open joint 57 and each second leg portion 56 extends from the second end 66 to the open joint 57. At the open joint 57, the leg portion 55 and 56 meet and are laterally bounded by an inner joint edge 67 and an outer joint edge 68.

As illustrated in FIG. 4, each internal cavity 52 or 53 may be closed by a bridge portion 58 of the lamination 43 (and of the rotor core 41 defined by the stack of laminations 43), such that no internal cavity 52 or 53 is in communication with the external surface of outer perimeter 50 of the rotor core 41. In other words, each end 65 and 66 of the cavities 52 and 53 is spaced from the external surface of outer perimeter 50 by a distance greater than zero.

Further, in FIG. 4, within each cavity group 51 the respective first end 65, first leg portion 55, joint 57, second leg portion 56, and second end 66 of the major and minor internal cavities 52 and 53 are separated from one another by a V-shaped web 59 that extends continuously from adjacent the first ends 65 to adjacent the second ends 66. In other words, in each cavity group 51, a V-shaped web 59 separates the major V-shaped internal cavity 53 from the minor V-shaped internal cavity 52.

As stated above, FIGS. 3 and 4 illustrate the rotor core 41 with empty cavities 52 and 53, i.e., without interior permanent magnets or structural elements within internal cavities. FIGS. 3 and 4 are presented in this manner for convenience and clarity. The embodiment of FIGS. 5 and 6 is also illustrated without interior permanent magnets.

Figure 5:
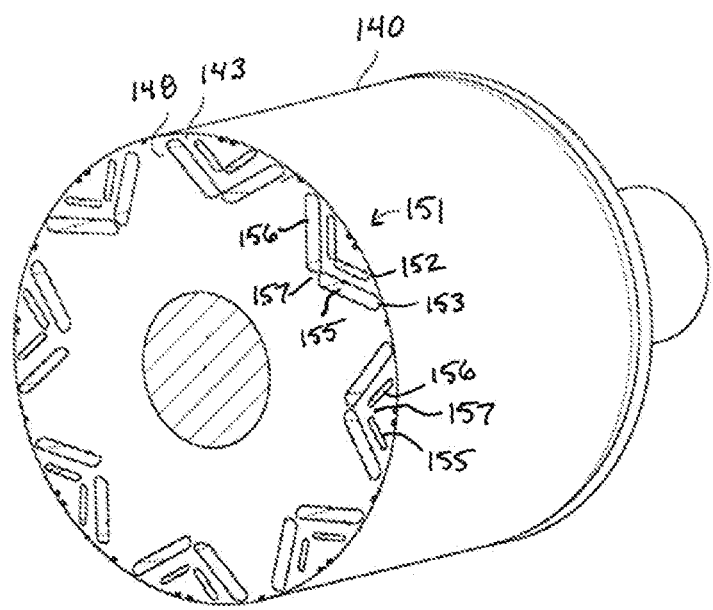
FIG. 5 is a fragmentary, cross sectional illustration of another rotor core, in accordance with various embodiments.
Figure 6:
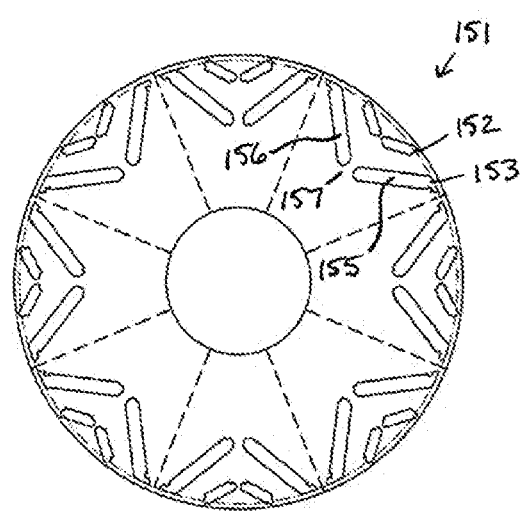
FIG. 6 is a plan view of a lamination of the rotor of FIG. 5, in accordance with various embodiments.

In FIGS. 5 and 6, another embodiment of a rotor core 140 is illustrated. Similar to FIGS. 3 and 4, a rotor core 140 is shown in isolation and detail. In FIG. 5, the rotor core 141 is shown in cross section with a side 148 of one of the laminations 143 exposed and visible.

As shown, rotor core 140 includes eight cavity groups 151 (separated by dashed lines in FIG. 6). Each cavity group includes a major layer 153 and a minor layer 152 of linear shaped cavities 155 and 156. Within each layer 152 and 153, the linear shaped cavities 155 and 156 are separated from one another by a web portion 157. If the rotor were designed without use of an annular sleeve compressing the rotor core 140 and without the use of non-magnetic structural elements (described below), then the web portions 157 must be designed and sized thick enough to carry substantially all of the centrifugal load and withstand stresses imposed at maximum rotation speed of the rotor. However, in such a design, the increased thickness of the web portions necessary to withstand stresses at increased rotation speeds, would cause the web portions to become sources of magnetic leakage. Therefore, as described below, the use of a compressive annular sleeve and non-magnetic structural elements provides for a reduced thickness of the web portions to carry only a portion of the centrifugal load, or elimination of the web portion altogether.

Thus, in certain embodiments herein, and as shown in FIGS. 3 and 4, web portions 157 have been eliminated from the rotor core 41. In other embodiments herein, and as shown in FIGS. 5 and 6, web portions 157 are present but have a reduced size or thickness due to the load carried by the non-magnetic structural elements and the compressive force applied by the annular sleeve, as compared to an embodiment in which the web portions 157 would have to carry the full load amount.

Figure 7:
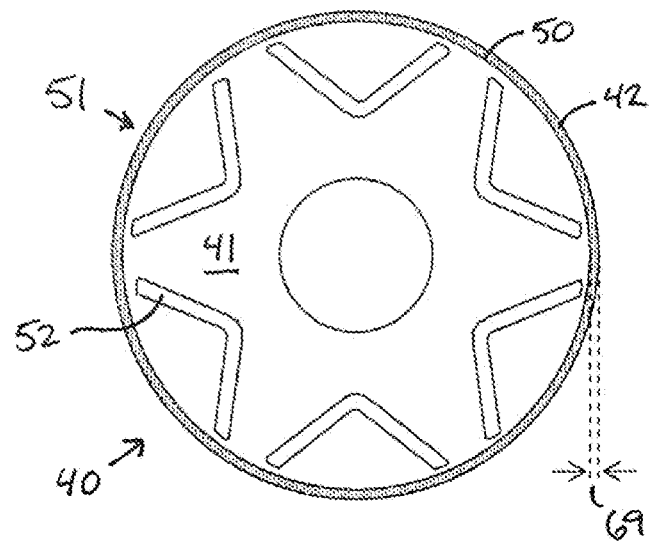
FIG. 7 is a plan view of another rotor core and the surrounding annular sleeve, in accordance with various embodiments.

FIG. 7 illustrates an embodiment of a rotor 40 with a rotor core 41 in which only a single cavity 52 is provided in each cavity group 51. Further, the rotor core 41 of FIG. 7 is provided with six cavity groups 51, defining six magnetic poles.

FIG. 7 also shows the annular sleeve 42 surrounding the rotor core 41. An exemplary annular sleeve 42 applies a preloading force of from 0.1% to 1.5% preloading. In other words, an exemplary annular sleeve 42 is stretched to a value between 0.1% to 1.5% to apply preloading force. As shown, the annular sleeve 42 contacts the external surface of the outer perimeter 50 and has a thickness 69. In exemplary embodiment, the maximum thickness of the annular sleeve is less than about 5 millimeters (mm), such as less than 2 mm. The annular sleeve 42 may be a solid continuous annular sheet having only an open top and an open bottom or, as described below, the annular sleeve 42 may be formed with perforations or radial openings, such as in the form of a mesh or weave. In an exemplary embodiment, the annular sleeve 42 is formed from a composite of carbon fiber held together with a resin. Various high-strength fibers may be suitable for use, including glass or other oxide fibers (e.g., basalt, alumina), very-high-strength polymer fibers (e.g., Kevlar® heat-resistant para-aramid synthetic fiber available from DuPont or Spectra® polyethylene fiber available from Honeywell), boron fibers, or metal fibers. Suitable resins may include epoxy, urethane, phenolic, bismaleimide, and the like.

Figure 8:
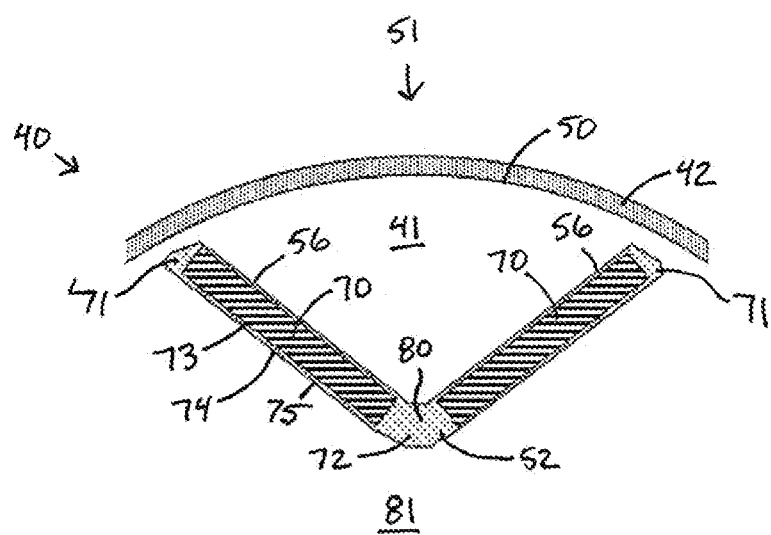
FIG. 8 is an exploded view of a portion of the rotor core and annular sleeve of FIG. 7, and illustrates interior permanent magnets locating in the rotor core, in accordance with various embodiments.

FIG. 8 is an exploded view of a portion of the rotor 40 of FIG. 7, illustrating a single cavity group 51 and the single cavity 52 therein, the external surface of the outer perimeter 50, and the annular sleeve 42 thereon. Further, FIG. 8 illustrates interior permanent magnets 70 located in the cavity 52.

It is noted that embodiments herein include rotors 40 having any suitable arrangement of cavities 52, such as with multiple layers including a single cavity each as in FIGS. 3 and 4, with multiple layers including multiple cavities each as in FIGS. 5 and 6, with single layers of single cavities as in FIG. 7, with single layers of multiple cavities, or with other arrangements, including combinations of features shown in FIGS. 4-8.

In the embodiment of FIG. 8, each interior permanent magnet 70 is received within a respective leg portion of the cavity 52. It is contemplated that in embodiments herein, an interior permanent magnet 70 is located in each leg portion 55 and 56 of each cavity 52 (and 53, when present), in the leg portions 55 and 56 of selected cavities 52 (and/or 53, when present), or in selected leg portions 55 and 56 of selected cavities 52 (and/or 53, when present). In other embodiments, a single interior permanent magnet 70 may be received in cavity 52.

As shown in FIG. 8, interior permanent magnets 70 are fit into cavity 52 in the rotor core 41. As used herein, "interior" means that the permanent magnets 70 are located within the rotor core, not on the external surface of the rotor core. The interior permanent magnets 70 may not fill the cavity 52 such that portions of cavity 52, such as end portions 71 and central portion 72 remain "empty", i.e., filled only with ambient air or gas. Also, while portions of the external surface 73 of the interior permanent magnet 70 may directly contact the cavity wall 74 defined by the rotor core 41, other portions of the external surface 73 of the interior permanent magnet 70 may be distanced from the adjacent cavity wall 74 such that gaps 75 are formed therebetween. For example, a clearance may be provided between the cavity wall 74 and the external surface 73 of the interior permanent magnet 70 to facilitate placement of the interior permanent magnet 70 within the cavity 52. In an exemplary embodiment, the clearance is about 0.1 millimeters (mm) on all sides of the interior permanent magnet 70. Therefore, portions of the external surface 73 of the interior permanent magnet 70 may be distanced from the adjacent cavity wall 74 by distances of 0.2 mm or less.

As shown in FIG. 8, in an exemplary rotor 40, a non-magnetic structural element 80 is also located in the cavity 52. The non-magnetic structural element 80 is formed from non-magnetic material or non-ferromagnetic material, i.e., material that is not attracted to magnets. The non-magnetic structural element 80 is provided to resist the pre-loading force applied by the compressive annular sleeve so that the rotor core withstands the compressive stress without buckling, collapsing, or otherwise deforming. Thus, an exemplary non-magnetic structural element 80 fills enough volume of the cavity so that the rotor core is not deformed by compressive force of sleeve. The structural element 80 may fill or at least partially fill the end portions 71, central portion 72, and gaps 75 of the cavity 52. For example, the structural element 80 may fill at least 50% of the remaining volume in the cavity 52 after the interior permanent magnets 70 are fitted therein, such as at least 60%, for example at least 70%, such as at least 80%, for example at least 90%, such as at least 95%, of the remaining volume in the cavity 52 after the interior permanent magnets 70 are fitted therein. In the illustrated embodiment, the non-magnetic structural element 80 extends from contact with one interior permanent magnet 70 to contact with the other interior permanent magnet 70.

In an exemplary embodiment, the structural element 80 is formed by injecting a flowable material, such as a liquid or gel, into the cavity 52 and curing the flowable material. For example, the structural element 80 may be formed by injecting a polymer resin into the cavity 52 and curing the polymer resin. In other embodiments, the structural element 80 may be a solid member that is inserted into the cavity 52. Such a solid member may be flexible and/or compressible. Further, in certain embodiments, the structural element 80 may be formed by an injected flowable material in combination with an inserted solid member or members.

An exemplary structural element 80 bonds to external surface 73 of each interior permanent magnet 70 and to the cavity wall 74. For example, a polymer resin used to form the structural element may be adhesive. Any suitable material may be used to form the structural element 80, though selection should be based on stability during operation temperatures and mechanical strength. For selection of the structural element, the coefficient of thermal expansion should be as closely matched to that of the other materials as possible. For example, for filling an otherwise empty cavity in a steel core, coefficient of thermal expansion (CoTE) should ideally be about the same as the steel across the −40° C. to 150° C. automotive electric motor temperature range. Further consideration should be given to selecting the structural element for use with magnets having odd thermal expansion characteristics. Further, a suitable structural element 80 has a Young's modulus of greater than about 8 GPa. Also, a suitable structural element 80 has a strength of over 50 MPa in tension. Further, a suitable structural element 80 is formed from material that is compatible with automatic transmission fluid and retains its performance from −40° C. to 150° C. This generally means a glass transition temperature greater than 150° C. In exemplary embodiments, the structural element is formed from a polymer that is generally filled with particles or short fibers to attain these performance features. These particles and/or fibers could be glass, minerals, or various oxides.

As noted above, during operation of the electric machine, the structural element 80 is provided to carry the tension load from the portion 81 of rotor core 41 located between the cavity 52 and the axis 25. In the embodiment of FIG. 8, where no web portion 157 is present, the structural element 80 alone carries such tension load. In embodiments in which a web portion 157 having a reduced thickness is present, a portion of the load is carried by the web portion 157 and a portion of the load is carried by the structural element 80.

In FIG. 8, the annular sleeve 42 is shown on the external surface of the outer perimeter 50. In exemplary embodiment, the minimum distance between the external surface of the outer perimeter 50 and the cavity wall 74 of cavity 52 is generally about 0.5 millimeters (mm) to 1 mm, and can be as great as 3 to 4 mm. In other words, the bridge portion 58 has a minimum thickness of from 0.5 to 4 mm, such as 0.5 mm, 1 mm, 3 mm, or 4 mm.

In certain embodiments, addition of a continuous annular sleeve over the outer perimeter 50 of the rotor core 41 would undesirably increase the effective air gap, i.e., the air space between the rotor core and the stator. Therefore, in some embodiments (and as shown in FIGS. 9 and 10), the external surface of the outer perimeter 50 is profiled to include slots to receive a non-continuous annular sleeve in order to prevent the need for an increased effective air gap.

Figure 9:
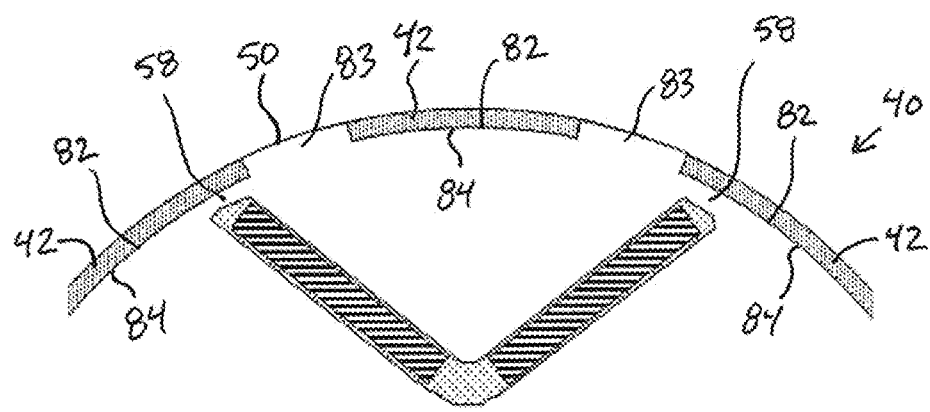
FIGS. 9 and 10 provide views similar to FIG. 8, and illustrate adjacent rotor laminations with a slotted external surface to receive a mesh annular sleeve, in accordance with various embodiments.
Figure 10:
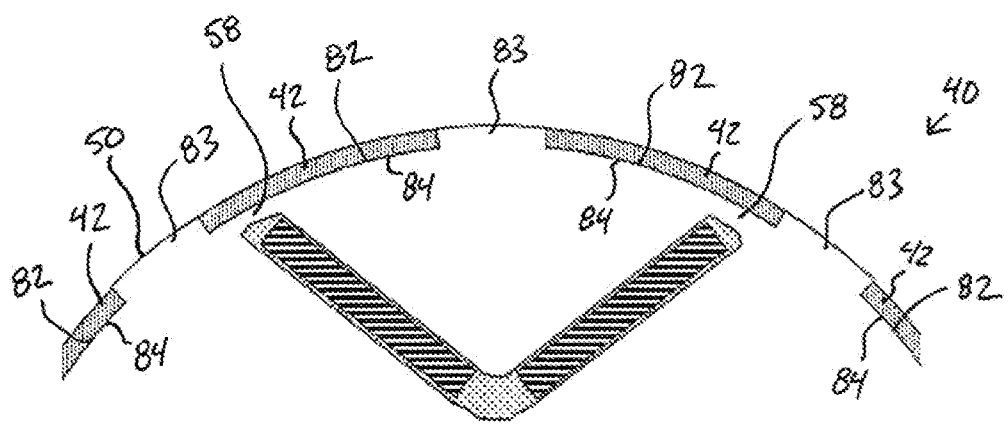

FIGS. 9 and 10 provide exploded views of a portion of the rotor 40 of FIG. 7, similar to FIG. 8. However, FIGS. 9 and 10 illustrate that the outer perimeter 50 may be profiled, or formed with slots 82. As a result, extended portions 83 of the outer perimeter 50 are formed at a first radial distance from the axis 25 and slotted or recessed portions 84 of the outer perimeter 50 are formed at a second radial distance from the axis 25. As shown, the first radial distance is greater than the second radial distance.

The outer perimeter 50 and slots 82 may be designed to optimize magnetic performance by locating the slots 82 (and the extended portions 83) while considering effects on magnetic flux and reluctance torque. In exemplary embodiments, the slots 82 are located where magnet leakage would otherwise be an issue, such as directly radially outward from the bridge portions 58.

As can be understood from FIGS. 9 and 10, in this embodiment the annular sleeve 42 is non-continuous, such as a mesh. It is contemplated that the annular sleeve 42 is formed with a rectangular mesh pattern or with a diamond mesh pattern, or with any other suitable geometry of radially-extending openings. As shown, the annular sleeve is located within the slots 82 and does not lie over the extended portions 83 of the outer perimeter 50. Locating the annular sleeve 42 in the slots 82, and not over the extended portions 83, provides for adding the annular sleeve 42 to the rotor core 41 without increasing the effective air gap between the rotor and the stator.

It may be understood that FIGS. 9 and 10 illustrate adjacent and alternating laminations in a stack forming a rotor core 41, and may provide for a diamond-pattern meshed annular sleeve 42.

A method for fabricating a rotor for an electric machine is also provided herein. In an exemplary embodiment, the method includes assembling a stack of laminations to form a rotor core having an external surface, wherein the rotor core defines an internal cavity and wherein an interior permanent magnet is positioned in the internal cavity. More specifically, the method may include assembling lamination segments to form each lamination with a cavity. Further, the method may include inserting a magnet layer in the cavity of the lamination. It is contemplated that the method includes inserting magnet layers in only selected cavities, i.e., not all cavities, or in all cavities. The method may continue with stacking the laminations and the layers of magnets therein. The laminations are aligned such that the cavities in adjacent laminations, and the magnet layers therein, are aligned and form the rotor core and interior permanent magnets. The method may include insulating the laminations from one another by a thin non-conductive coating.

The exemplary method also includes locating a non-magnetic structural element in the internal cavity. As described above, the non-magnetic structural element may be formed from a flowable material such as a liquid or gel. Inserting the non-magnetic structural element may include injecting the flowable material into the internal cavity. Other embodiments may include inserting a solid non-magnetic structural element into the cavity, or injecting and/or inserting a combination of flowable material and solid material.

The exemplary method further includes applying a compressive force on the external surface of the rotor core with an annular sleeve after locating the non-magnetic structural element in the internal cavity. In exemplary embodiments, the annular sleeve applies a preloading force of from 0.1% to 1.5% preloading. In exemplary embodiments, the sleeve is pre-formed and is press-fitted or slid onto rotor. In other embodiments, the sleeve is formed by tension winding a fiber around the external surface of the rotor core and curing the fiber to form the annular sleeve on the external surface of the rotor core. In either embodiment, the interior permanent magnets and non-magnetic structural elements are located in the rotor cavities before the sleeve is put onto the rotor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for fabricating a rotor for an electric machine, the method comprising:
    assembling a stack of laminations to form a rotor core having an external surface, wherein the external surface is profiled to define slots and extended portions, wherein the extended portions define an outer perimeter of the rotor core, wherein the rotor core defines one to five layers of internal cavities and wherein an interior permanent magnet is positioned in at least one selected internal cavity;
    locating a non-magnetic structural element in the selected internal cavity; and
    applying a compressive force on the external surface of the rotor core with an annular sleeve, wherein the annular sleeve is non-continuous and is located in the slots and not over the extended portions, wherein applying the compressive force on the external surface of the rotor core with the annular sleeve comprises tension winding a fiber around the external surface of the rotor core and curing the fiber to form the annular sleeve in the slots of the external surface of the rotor core.

2. The method of claim 1 wherein applying the compressive force on the external surface of the rotor core with the annular sleeve comprises providing a pre-formed annular sleeve and press-fitting the pre-formed annular sleeve on the external surface of the rotor core and into the slots.

3. The method of claim 1 wherein:
    the rotor core defines an axis of rotation of the rotor;
    the outer perimeter defined by the extended portions are located at a first radial distance from the axis;
    the annular sleeve has an outer surface at a second radial distance from the axis; and
    the second radial distance is not greater than the first radial distance.

4. The method of claim 1 wherein the annular sleeve has a maximum thickness of less than 5 millimeters (mm).

5. The method of claim 1 wherein:
    the rotor core defines an axis of rotation of the rotor;
    the selected internal cavity is a V-shaped cavity and includes a first leg portion and a second leg portion that are interconnected at a central portion;
    the central portion located nearest the axis;
    the first leg portion extends away from the axis to a first end;
    a first slot on the external surface is radially aligned with the first end;
    the second leg portion extends away from the axis to a second end; and
    a second slot on the external surface is radially aligned with the second end.

6. The method of claim 1 wherein:
    the selected internal cavity is a V-shaped cavity and includes a first leg portion extending to a first end and a second leg portion extending to a second end;
    a first location on the external surface is nearest to the first end;
    the first location is located in a first slot;
    a second location on the external surface is nearest to the second end; and
    the second location is located in a second slot.

7. The method of claim 1 wherein:
    the selected internal cavity is a V-shaped cavity and includes a first leg portion and a second leg portion;
    the interior permanent magnet includes a first interior permanent magnet positioned in the first leg portion of the selected internal cavity;
    the interior permanent magnet includes a second interior permanent magnet positioned in the second leg portion of the selected internal cavity;
    the non-magnetic structural element extends from contact with the first interior permanent magnet to contact with the second interior permanent magnet;
    the first interior permanent magnet is located nearer to a first slot than to any one of the extended portions; and
    the second interior permanent magnet is located nearer to a second slot than to any one of the extended portions.

8. The method of claim 1 wherein assembling the stack of laminations to form the rotor core comprises:
    assembling lamination segments to form each assembled lamination with a cavity;
    inserting a magnet layer in the cavity; and
    stacking the assembled laminations.

9. A rotor for an electric machine comprising:
    a rotor core having an external surface and defining an axis, wherein the rotor core defines one to five layers of internal cavities, wherein the external surface is formed with extended portions and slots, wherein the external surface in the extended portions is located at a first radial distance from the axis, wherein the external surface in the slots is located at a second radial distance from the axis, and wherein the first radial distance is greater than the second radial distance;
    an interior permanent magnet located in a selected internal cavity;
    a non-magnetic structural element located in the selected internal cavity; and
    an annular sleeve surrounding and applying a compressive force on the external surface of the rotor core in the slots, wherein the annular sleeve is not located at a radial distance greater than the first radial distance from the axis.

10. The rotor of claim 9 wherein the annular sleeve is not located radially outward of the extended portions.

11. The rotor of claim 9 wherein the annular sleeve has a maximum thickness of less than 5 millimeters (mm) and wherein the annular sleeve is not located at a distance from the axis greater than the second radial distance.

12. The rotor of claim 9 wherein the annular sleeve does not apply a compressive force on the external surface of the rotor core in the extended portions.

13. The rotor of claim 9 wherein:
the selected internal cavity is a V-shaped cavity and includes a first leg portion and a second leg portion;
the interior permanent magnet includes a first interior permanent magnet located in the first leg portion of the selected internal cavity;
the interior permanent magnet includes a second interior permanent magnet located in the second leg portion of the selected internal cavity; and
the non-magnetic structural element extends from contact with the first interior permanent magnet to contact with the second interior permanent magnet.

14. The rotor of claim 9 wherein the selected internal cavity is separated from the external surface in a selected slot by a bridge portion of the rotor core.

15. A vehicle comprising:
an electric machine configured to actuate the vehicle, wherein the electric machine includes a rotor and a stator, wherein the rotor comprises:
a rotor core defining an axis and having an external surface formed with extended portions and slots, wherein the external surface in the extended portions is located at a first radial distance from the axis, and wherein the rotor core defines an internal cavity;
an interior permanent magnet located in the internal cavity;
a non-magnetic structural element located in the internal cavity; and
an annular sleeve located within the slots and surrounding and applying a compressive force on the external surface of the rotor core in the slots, wherein the annular sleeve is not located at a radial distance greater than the first radial distance from the axis.

16. The vehicle of claim 15 wherein the annular sleeve is not located radially outward of the extended portions.

17. The vehicle of claim 15 wherein the external surface in the slots is located at a second radial distance from the axis, wherein the annular sleeve has a maximum thickness of less than 5 millimeters (mm), and wherein the annular sleeve is not located at a distance from the axis greater than the second radial distance.

18. The vehicle of claim 15 wherein the annular sleeve does not apply a compressive force on the external surface of the rotor core in the extended portions.

19. The vehicle of claim 15 wherein:
the internal cavity is a V-shaped cavity and includes a first leg portion and a second leg portion;
the interior permanent magnet includes a first interior permanent magnet located in the first leg portion of the internal cavity;
the interior permanent magnet includes a second interior permanent magnet located in the second leg portion of the internal cavity; and
the non-magnetic structural element extends from contact with the first interior permanent magnet to contact with the second interior permanent magnet.

20. The vehicle of claim 15 wherein the internal cavity is separated from the external surface in a selected slot by a bridge portion of the rotor core.

\* \* \* \* \*